(12) United States Patent
Pogorelik et al.

(10) Patent No.: US 11,277,273 B2
(45) Date of Patent: Mar. 15, 2022

(54) COMPUTER NETWORK SERVICE PROVIDING SYSTEM INCLUDING SELF ADJUSTING VOLUME ENFORCEMENT FUNCTIONALITY

(71) Applicant: ARRIS Enterprises LLC, Suwanee, GA (US)

(72) Inventors: Oleg Pogorelik, Lapid (IL); Doron Givoni, Herzliya (IL); Alon Zamir, Tel Aviv (IL)

(73) Assignee: ARRIS Enterprises, LLC, Suwanee, GA (US)

( * ) Notice: Subject to any disclaimer, the term of this patent is extended or adjusted under 35 U.S.C. 154(b) by 63 days.

(21) Appl. No.: 16/507,747

(22) Filed: Jul. 10, 2019

(65) Prior Publication Data

US 2020/0014549 A1  Jan. 9, 2020

Related U.S. Application Data

(63) Continuation of application No. 13/441,744, filed on Apr. 6, 2012, now Pat. No. 10,404,480, which is a
(Continued)

(51) Int. Cl.
| | |
|---|---|
| *H04L 12/14* | (2006.01) |
| *G06Q 10/04* | (2012.01) |
| *H04L 41/50* | (2022.01) |
| *H04L 43/024* | (2022.01) |
| *H04L 43/16* | (2022.01) |
| *H04L 47/20* | (2022.01) |
| *H04L 41/147* | (2022.01) |

(52) U.S. Cl.
CPC ......... *H04L 12/1467* (2013.01); *G06Q 10/04* (2013.01); *H04L 12/14* (2013.01); *H04L 41/5029* (2013.01); *H04L 43/024* (2013.01); *H04L 43/16* (2013.01); *H04L 47/20* (2013.01); *H04L 41/147* (2013.01)

(58) Field of Classification Search
CPC . H04L 43/0876; H04L 43/08; H04L 43/0882; H04L 43/16; H04L 43/10
See application file for complete search history.

(56) References Cited

U.S. PATENT DOCUMENTS

| | | |
|---|---|---|
| 6,684,072 B1 | 1/2004 | Anvekar |
| 6,947,723 B1 | 9/2005 | Gumani |
| (Continued) | | |

FOREIGN PATENT DOCUMENTS

| | | |
|---|---|---|
| JP | 2006-070464 | 3/1994 |
| JP | 2006-215610 | 8/2006 |
| (Continued) | | |

OTHER PUBLICATIONS

Extended European Search Report, of EP 10821674.8, dated Oct. 26, 2016, 11 pgs.
(Continued)

*Primary Examiner* — Esther B. Henderson
(74) *Attorney, Agent, or Firm* — Steven Stupp; Stewart Wiener

(57) ABSTRACT

A Computer Network Service Providing System including Self Adjusting Volume enforcement functionality and methods for diminishing or minimizing volume leakage.

20 Claims, 10 Drawing Sheets

Related U.S. Application Data continuation of application No. PCT/IL2010/000816, filed on Oct. 7, 2010.

(60) Provisional application No. 61/249,373, filed on Oct. 7, 2009.

(56) References Cited

U.S. PATENT DOCUMENTS

| | | |
|---|---|---|
| 7,149,293 B1 | 12/2006 | Coppage |
| 7,167,915 B2 | 1/2007 | Bendich et al. |
| 7,292,531 B1 | 11/2007 | Hill |
| 7,366,495 B1 | 4/2008 | Magnotta |
| 7,433,943 B1 | 10/2008 | Ford |
| 7,860,006 B1 | 12/2010 | Kashyap |
| 7,899,166 B1 | 3/2011 | Ravindranath |
| 7,912,950 B1 | 3/2011 | Saparoff |
| 7,978,607 B1 | 7/2011 | Halabi et al. |
| 8,688,825 B1 | 4/2014 | Shani |
| 2001/0024950 A1 | 9/2001 | Hakala |
| 2002/0046277 A1 | 4/2002 | Barna |
| 2002/0083169 A1* | 6/2002 | Aki ............... H04L 43/00 709/224 |
| 2002/0133457 A1 | 9/2002 | Gerlach |
| 2002/0133722 A1 | 9/2002 | Levanon et al. |
| 2003/0046396 A1* | 3/2003 | Richter ............. G06F 9/505 709/226 |
| 2003/0086548 A1 | 5/2003 | Nelson |
| 2003/0200317 A1 | 10/2003 | Zeitak et al. |
| 2004/0010544 A1 | 1/2004 | Slater |
| 2004/0064293 A1 | 4/2004 | Hamilton |
| 2004/0078461 A1 | 4/2004 | Bendich et al. |
| 2004/0143523 A1 | 7/2004 | Pegaz-Paquet |
| 2006/0090076 A1 | 4/2006 | De Cnodder |
| 2006/0217106 A1 | 9/2006 | Davidson |
| 2006/0235962 A1* | 10/2006 | Vinberg ........... H04L 63/0263 709/224 |
| 2007/0002897 A1 | 1/2007 | Goshen et al. |
| 2007/0081543 A1 | 4/2007 | Brenes |
| 2007/0087756 A1 | 4/2007 | Hoffberg |
| 2007/0179796 A1 | 8/2007 | Taglienti |
| 2007/0190980 A1 | 8/2007 | Britt |
| 2007/0226348 A1 | 9/2007 | Grabarnik |
| 2007/0283385 A1 | 12/2007 | Qiu et al. |
| 2008/0049641 A1 | 2/2008 | Edwards |
| 2008/0091822 A1 | 4/2008 | Sheinfeld |
| 2008/0095173 A1 | 4/2008 | Bugenhagen |
| 2008/0123603 A1 | 5/2008 | Cai |
| 2008/0162159 A1 | 7/2008 | Wang |
| 2008/0225708 A1 | 9/2008 | Lange |
| 2008/0253393 A1 | 10/2008 | Blackburn |
| 2009/0029673 A1 | 1/2009 | Hamadi |
| 2009/0059812 A1 | 3/2009 | Chinnaswamy |
| 2009/0113062 A1 | 4/2009 | Woodman |
| 2009/0135839 A1 | 5/2009 | Khasnabish |
| 2009/0154675 A1 | 6/2009 | Hanson |
| 2009/0187968 A1* | 7/2009 | Roese ............. H04L 41/0893 726/1 |
| 2010/0015926 A1 | 1/2010 | Luff |
| 2010/0017506 A1 | 1/2010 | Fadell |
| 2010/0035576 A1 | 2/2010 | Jones |
| 2010/0041369 A1 | 2/2010 | Narayan |
| 2010/0082505 A1 | 4/2010 | Hollingsworth et al. |
| 2010/0169475 A1 | 7/2010 | Woundy |
| 2010/0188975 A1 | 7/2010 | Raleigh |
| 2010/0191613 A1 | 7/2010 | Raleigh |
| 2010/0246436 A1 | 9/2010 | Yang |
| 2010/0296397 A1 | 11/2010 | Fraccalvieri |
| 2010/0325268 A1 | 12/2010 | Muthiah |
| 2011/0044353 A1 | 2/2011 | Foottit |
| 2011/0153724 A1 | 6/2011 | Raja |
| 2011/0211465 A1 | 9/2011 | Farrugia |
| 2011/0264726 A1 | 10/2011 | Zabawskyj |
| 2011/0275344 A1 | 11/2011 | Momtahan |
| 2011/0276442 A1 | 11/2011 | Momtahan |
| 2011/0320620 A1 | 12/2011 | Cutler |
| 2012/0030017 A1* | 2/2012 | Jones ............. H04L 63/08 705/14.49 |
| 2012/0129490 A1 | 5/2012 | Sharma |
| 2013/0103641 A1* | 4/2013 | Rehman ............. G06F 11/3065 707/609 |

FOREIGN PATENT DOCUMENTS

| | | |
|---|---|---|
| WO | 2004/023780 A1 | 3/2004 |
| WO | 2004/079542 A2 | 9/2004 |

OTHER PUBLICATIONS

Nokia, "Rel-6 TS 32.298 Addition of Flow Based Charging Parameters", Jul. 3, 2008, 31 pgs.

Japanese Notification of Reason for Rejection of JP 2012-532716, dated Sep. 29, 2014.

PCT International Search Report and Written Opinion of PCT/IL10/00816, dated Feb. 17, 2011.

PCT International Preliminary Search Report on Patentability of PCT/IL10/00816, dated Apr. 11, 2012.

* cited by examiner

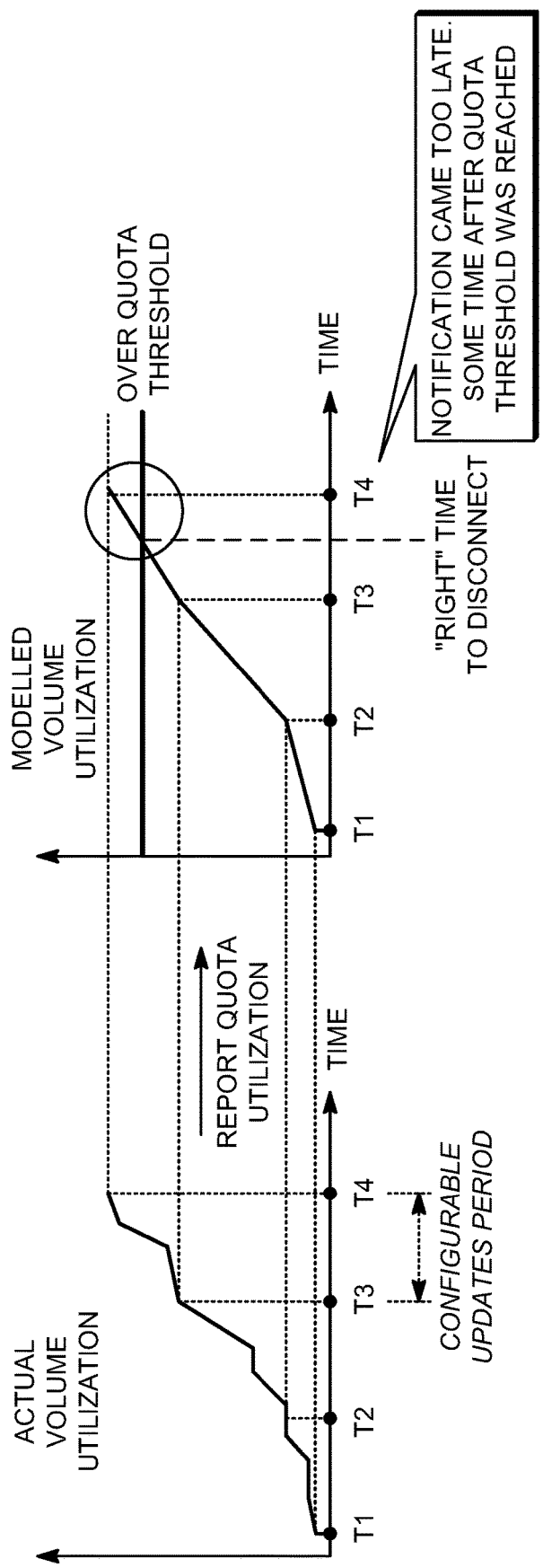
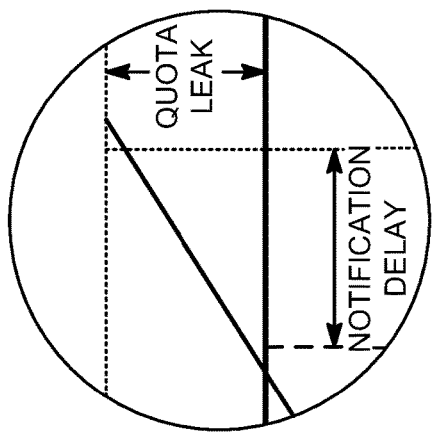
FIG. 3A
FIG. 3B

COMPUTER NETWORK SERVICE PROVIDING SYSTEM INCLUDING SELF ADJUSTING VOLUME ENFORCEMENT FUNCTIONALITY

REFERENCE TO RELATED CASES

This application is a continuation of PCT application PCT/IL2010/000816 which, in turn, claims priority from U.S. provisional application No. 61/249,373, entitled "Apparatus and methods for self adjusting volume enforcement in a computer network service providing system" and filed 7 Oct. 2009.

FIELD OF THE INVENTION

The present invention relates generally to computer networks and more particularly to computerized management of Computer Network Service Providing systems.

BACKGROUND OF THE INVENTION

Conventional network infrastructure is based on a subscription-centric model, e.g. as shown in prior art FIG. 1, where every subscriber procures a business package that grants him or her an appropriate service level and an amount of the network resources (also known as pre-paid subscription), such as an access volume and/or a time of the information transfer. Pre-paid Volume quota is one of the core paradigms in modern ISPs' business cases,

SUMMARY OF THE INVENTION

Certain embodiments of the present invention seek to provide a Computer Network Service Providing System including Self Adjusting Volume Enforcement Functionality. The term "volume" refers to the volume of traffic passing through a computer network e.g. the number of bytes of information transferred to and from a given subscriber.

Certain embodiments of the present invention seek to diminish or minimize volume leakage.

Typical computer network service Provisioning and Control systems include resource utilization monitoring functionality typically comprising accounting engines, complemented by a charging system, responsible for the managing of the resource limitations also known as a quota e.g. network traffic volume quota. Managing of the volume (MBits up, down and total) quota usually suffers from inaccuracies, caused by volume utilization measurement granularity. Certain embodiments of the present invention seek to provide systems and methods for self adjustment useful in conjunction with accounting, charging or both engines in order to cope with measurement inaccuracies. Volume Leak may include an amount of traffic that was used by subscriber without paying (over quota) due to artifacts of the techniques by which the control system manages access controllers. Conventional techniques are based on incoming notifications which may be asynchronous and non-reliable and/or polling where poll frequency is low and is tuned to ensure feasible device loading.

The term "volume leak" may include traffic volume (in Bytes of the up/down or total stream) provided to a subscriber that the subscriber has not paid for, due to inaccuracy of the computer network service providing system to timely discover that the subscriber has reached his paid-for volume quota.

There is thus provided, in accordance with at least one embodiment of the present invention, a computerized system for computer network volume-quota enforcement based on dual-frequency volume-utilization polling operative in conjunction with a service stopper stopping service to a subscriber if his computer network volume-quota has been exceeded, the system comprising a utilization poller operative to poll at least one subscriber for volume utilization and to provide updates accordingly to the stopper; and a dual-frequency polling controller operative to cause the poller to poll at a first frequency when the subscriber is about to exceed his quota arid at a second frequency lower than the first frequency when the subscriber is far from exceeding his quota.

Further in accordance with at least one embodiment of the present invention, the system also comprises a service stopper operative for stopping service to a subscriber if his computer network volume-quota has been exceeded.

Still further in accordance with at least one embodiment of the present invention, the dual-frequency polling controller causes the poller to poll infrequently except when an indication has become available indicating that the subscriber is about to exceed his quota.

Additionally in accordance with at least one embodiment of the present invention, the subscriber's quota is supplied to the subscriber by a quota manager in chunks and wherein the indication comprises an indication that a last chunk remaining in the subscriber's quota, has been supplied to the subscriber.

Still further in accordance with at least one embodiment of the present invention, the indication comprises an estimate of whether or not the subscriber is likely to finish his quota before a next update is provided to the stopper, assuming the second lower frequency continues to be used.

Additionally in accordance with at least one embodiment of the present invention, the indication comprises an estimate of the period of time remaining until the subscriber finishes his quota.

Further in accordance with at least one embodiment of the present invention, the estimate is a worst case estimate which assumes that the subscriber's rate of utilization is at least as large as the subscriber's rate of utilization can actually be, thereby to prevent quota leakage while causing overcharging.

Still further in accordance with at least one embodiment of the present invention, the estimate is a best case estimate which assumes that the subscriber's rate of utilization is no larger than a physical minimum that a subscriber's rate of utilization can actually be, thereby to cause quota leakage while preventing overcharging.

Further in accordance with at least one embodiment of the present invention, data re past volume utilization of the subscriber over a window of time is saved and is used for computing the estimate.

Still further in accordance with at least one embodiment of the present invention, the estimate is computed assuming average throughput, over the window, and will be consumed by the subscriber.

Additionally in accordance with at least one embodiment of the present invention, the estimate is computed assuming peak throughput, over the window, and will be consumed by the subscriber.

Also provided, in accordance with at least one embodiment of the present invention, is a computerized method for computer network volume-quota enforcement based on dual-frequency volume-utilization polling operative in conjunction with a service stopper stopping service to a subscriber if his computer network volume-quota has been exceeded, the method comprising computerized polling of at least one subscriber for volume utilization and provision of updates accordingly to the stopper; and using a processor to control the polling including causing polling to occur at a first frequency when the subscriber is about to exceed his quota and at a second frequency lower than the first frequency when the subscriber is far from exceeding his quota.

Further in accordance with at least one embodiment of the present invention, the computer network comprises the Internet.

Still further in accordance with at least one embodiment of the present invention, the estimate is refined in view of at least one volume utilization update received after the estimate was generated.

Additionally in accordance with at least one embodiment of the present invention, the estimate is refined in view of each volume utilization update received after the estimate was generated.

Also provided, in accordance with at least one embodiment of the present invention, is an online charging method using the above method.

Further provided, in accordance with at least one embodiment of the present invention, is a computer program product, comprising a computer usable medium having a computer readable program code embodied therein, the computer readable program code adapted to be executed to implement any of the methods shown and described herein.

Additionally provided, in accordance with at least one embodiment of the present invention, is an online charging system including the above system.

Further provided, in accordance with at least one embodiment of the present invention, is a computer network service providing system including a computerized volume enforcement module having a self adjusting functionality, the module including apparatus for using a processor to identify at least one of quota leakage and overcharge management.

Still further in accordance with at least one embodiment of the present invention, resource consumption is continuously evaluated in order to determine possible exceeding of quota limit.

Additionally in accordance with at least one embodiment of the present invention, a quota "close" to the limit activates a high rate quota pinging mechanism operative to reduce at least one of probability and size of a possible quota leak Still further in accordance with at least one embodiment of the present invention, when a quota utilization criterion is true, at least one ongoing session is stopped automatically.

Also provided, in accordance with at least one embodiment of the present invention, is a computer network service providing system including a volume enforcement module having a self adjusting functionality, the module including apparatus for using a processor to predict a disconnect time.

Further in accordance with at least one embodiment of the present invention, the apparatus for predicting is operative to utilize at least one Prediction Rule operative to predict quota utilization by volume, tuned per at least one of subscriber and service type.

Still further in accordance with at least one embodiment of the present invention, the system also comprises a Learning System having a prediction rules manager.

Additionally in accordance with at least one embodiment of the present invention, the prediction rules manager comprises a low rate process running periodically above session history and performing exhaustive evaluation of at least one core model.

Further in accordance with at least one embodiment of the present invention, the manager performs at least one of: finding that a first graph matches better than a second graph for an individual service and specifying an update in formula factors.

Still further in accordance with at least one embodiment of the present invention, the system also includes apparatus for predicting a predetermined disconnect time.

Additionally in accordance with at least one embodiment of the present invention, the quota utilization criterion comprises quota utilization being at a level of 100%+/−a pre-configured delta parameter.

Further in accordance with at least one embodiment of the present invention, the individual service comprises a Games on Demand service.

Also provided, in accordance with at least one embodiment of the present invention, is a computerized system for computer network volume-quota enforcement comprising Predictor Apparatus for predicting a quota-exhausted time at which a volume quota will be exceeded by a subscriber, based on at least one volume quota utilization update indicating that the volume-quota has not yet been exceeded; and apparatus for diminishing quota leakage, based on the quota-exhausted time generated by the predictor apparatus, relative to a system in which computer network service to the subscriber is discontinued only upon arrival of a periodic volume quota utilization update indicating that a volume-quota has been exceeded.

Further in accordance with at least one embodiment of the present invention, the apparatus for diminishing quota leakage includes apparatus for discontinuing service to the subscriber prior to the periodic volume quota utilization update indicating that a volume-quota has been exceeded, at a time related to the quota-exhausted time generated by the predictor apparatus.

Further in accordance with at least one embodiment of the present invention, the apparatus for diminishing quota leakage includes apparatus for polling for volume utilization more frequently, relative to previous periodic volume utilization updates. Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where ever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product. Elements separately listed herein need not be distinct components and alternatively may be the same structure.

Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may-be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated In the following drawings:

FIG. 3*a* is a set of volume utilization to time graphs illustrating that due to a periodic update, notification, threshold cross over may be detected too late i.e. only after a quota threshold is reached. The left graph reflects real quota utilization by time. The right graph reflects an approximated utilization graph as presented in the service control system. As shown, in the mapping of the actual consumption to the view seen by the control system, there is smoothing due to the granularity of the reporting process hence not all perturbations in the left-hand graph are visible in the right-hand graph.

FIG. 3*b* is an enlarged view of the bubble in the right graph in FIG. 3*a*, showing the volume leak caused by the delayed update.

FIG. 10 is a simplified semi-pictorial semi-functional block diagram illustration of a Self Adjusting Volume Enforcement System, according to certain embodiments of the present invention.

DETAILED DESCRIPTION OF CERTAIN EMBODIMENTS

The term "Volume" as used herein is intended to include a measure of how much, e.g. how many bytes of information, were transferred from and to an individual subscriber e.g. to a computer network. Typically, volume is measured in Mega Bytes or Giga Bytes. Some ISPs sell an Absolute Quota in GBytes, or Recurrent quota in GBytes per month. Volume utilization may depend on the application/service specifics (e.g. Google maps may retrieve big maps from the server) and on the subscriber consumption pattern (business, residential, etc.). Volume could be accounted separately for Up and Down traffic as well as for both directions in a single total.

Pre paid Volume quota is one of the core paradigms in modern ISPs' business cases. In large networks volume quota may be managed by the Access Server. Otherwise, e.g. as shown in FIG. 2, volume quota accounting and control may be performed by the Service Control Infrastructure which may be operative to monitor account volume and generate disconnect commands when a predetermined relevant quota for traffic volume that a subscriber is entitled to, is exceeded.

Since, typically, volume utilization is a continuous process, while utilization information is reported in predefined (2-60 min) periods, service providers are forced to cope with disconnect inaccuracy problems which may lead to either quota leakage or overcharging.

Overcharging occurs when a subscriber is charged for volume the subscriber did not actually use. This may happen when the charging system charges the subscriber by estimating rather than retroactively measuring resource utilization (e.g. because utilization report is delayed) and the subscriber's actual session terminated before the estimated end.

Figure 1:
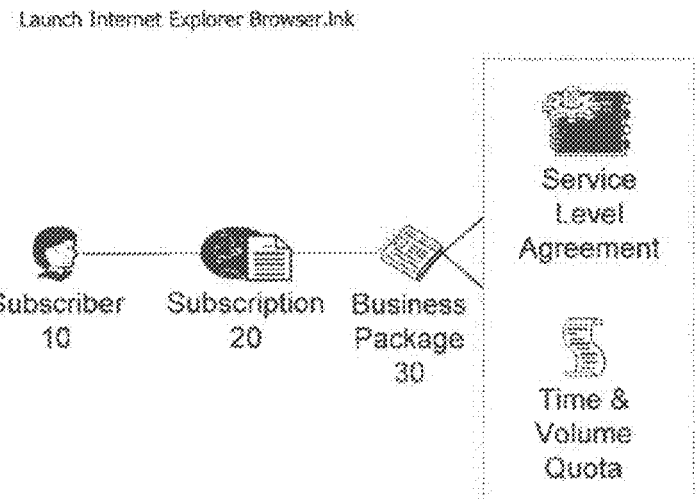
FIG. 1 is a simplified pictorial prior art illustration of network infrastructure based on a subscription-centric model.
Figure 2:
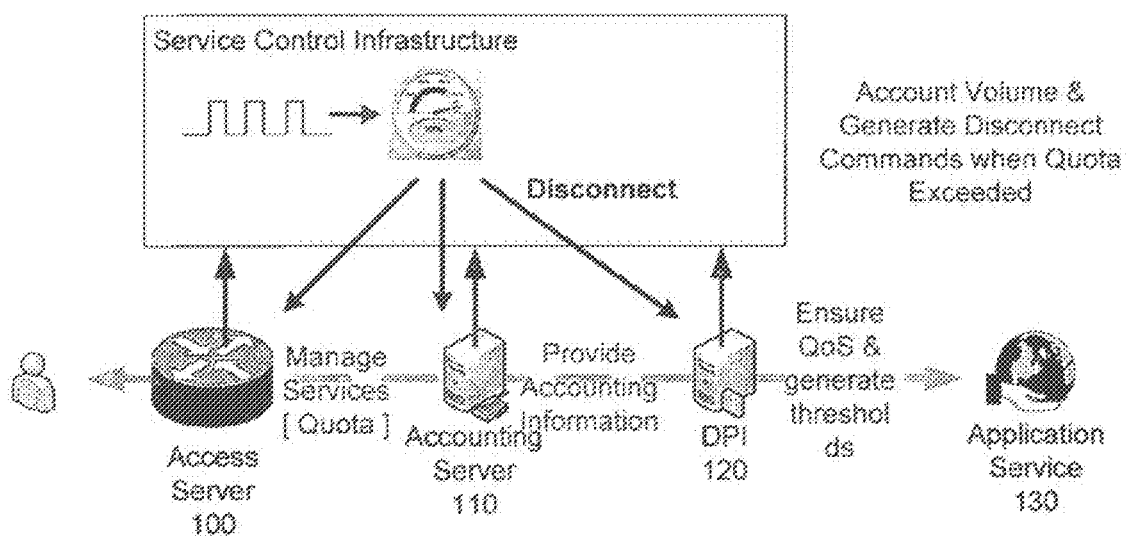
FIG. 2 is a simplified semi-pictorial semi-functional block diagram illustration of Service Control Infrastructure having volume quota accounting and control functionalities which may be operative to monitor account volume and generate disconnect commands when a predetermined relevant quota is exceeded.

The components of FIG. 2 are now described in detail The Access server 100 typically comprises a conventional control device which manages user connectivity to a communications network while performing at least one of authentication, authorization and connection provisioning. Example access servers include Broadband Remote Access Server (vendors—CISCO ISG, REDBACK SmartEdge, etc.), GPRS Gateway Services Node (vendors—CISCO, Ericsson, Alcatel, etc.), and Wi-Fi Access Point (vendors CISCO, Nokia-Siemence, Alcatel, etc.).

The Accounting server 110 typically comprises a conventional control device, used for accounting of the resources utilization by user[s] who are connected to the network. This server is typically operative for collecting and formatting of accounting data (e.g. using RADIUS protocol) as well as for sending updates to higher level systems, such as conventional online charging systems or online charging systems incorporating any of the systems and methods shown and described herein.

The DPI (Deep Packet Inspector) 120 is a policy enforcement device that applies an appropriate application-specific policy per user's connection, stream, etc. by managing priorities of the streams, dropping packets, etc.

QoS computation functionality typically combines several parameters, such as Bandwidth Limit, Relative Priority, Packet Delay, and is a parameter of the policy applied to the network connection and managed per user or land user's service.

The DPI 120 together with a Policy Enforcement functionality may perform accounting of the traffic per user, service, protocol, etc. As with access gateways, some DPIs may support thresholds per volumes and may notify a higher level system on reaching the quota thresholds.

As shown in an example illustrated in FIG. 3a-3b, threshold cross over, in which a computer network subscriber is found to have crossed over from having unutilized quota for volume, to having no unutilized quota, may be detected in a periodic volume utilization update Ti, such as T4 as shown. However this causes a subscriber to get additional connection time for free causing "Quota Leak" as defined in FIG. 3b, which enlarges the bubble of the right-hand graph in FIG. 3a. Quota leakage could be minimized by decreasing of the update periods, but this creates heavy overloading of the devices and the network, so that finally the update period is configured as several minutes (2-60), which may result in several Mbytes of quota leakage for consumption-aggressive services, such as but not limited to VoD and P2P. FIG. 3a is a mapping of real consumption to the view seen by the control system, which is smoothed due to the reporting resolution such that not all perturbations are visible. The left-hand graph of FIG. 3a shows actual volume utilization by a subscriber, whereas the right-hand graph shows a model of volume utilization based on linear interpolation between periodic volume utilization updates T1, T2, . . . . As shown, notification in the right-hand graph came too late, i.e. after the quota threshold was already reached. Certain embodiments of the present invention describe a system and method for minimizing quota leakage and overcharging. Certain embodiments of the present invention enable a service provider to increase accuracy of the quota measurement while reducing or eliminating related accompanying overloading of the network and devices.

According to certain embodiments, a Self Adjusting Volume Enforcement functionality, also termed herein SAVE, is provided, which performs predictive computation. For example, if a user's physical connection throughput (UTh) is 4 MBit/s and the Pre-allocated quota (prQ) is 1 MByte, then in a worst or most extreme case, in which the user constantly utilizes his maximum throughput, the Time to disconnect is:

$$TTerm=PrQ*8*1024*1024/UTh*1000000 \quad \text{(formula A)}$$

which yields a 23 sec run of the theoretical disconnect time. "Early QuotaThreshold Cross Over" prediction may trigger a suitable, application-specific decision making mechanism activated at the theoretical disconnect time which arrives at a decision as a function of configurable criteria such as but not limited to: disconnect, if predefined change in QoS then restrict access, ask higher level control system.

The decision making mechanism may for example disconnect service to the subscribe at an expected time. It is appreciated that conventional pre-paid flow arrangements ask for a pre-allocated "credited" quota and repeat queries before the quota is deemed to have been exceeded. In the event that there is no more quota to allocate, the user is disconnected. This typically occurs in the last phase where user is about to run out of her or his last allocated quota.

The decision making mechanism may for example run a typically precise and frequent (e.g. once every 1-30 secs) quota utilization poll for a short time period. Eventually service is stopped before accepting the "too late" update (T4) thereby to diminish or minimize volume quota leakage and/or overcharging.

Figure 4:
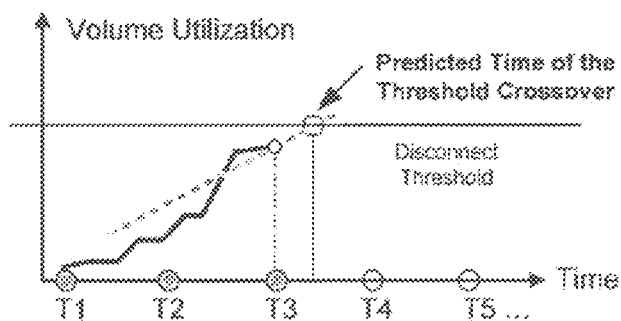
FIG. 4 is a graph of relevant timing, showing a predicted time of threshold crossover vs. a disconnect threshold defined in accordance therewith. As shown, predicted disconnection should occur before T4 when disconnection is based on periodic updates. Stop occurs only after T4, which is too late, hence causes quota leak. The dashed line provides an example of linear approximation used in prediction. Generally, Linear Approximation uses y=ax+b, where y is the estimated quota utilization, x is a service bit-rate, and a and b are the coefficients that are tuned due to service type or user average utilization measurements.

FIG. 4 is a timing graph, showing a predicted time of threshold crossover vs. a disconnect threshold defined in accordance therewith.

Figure 5:
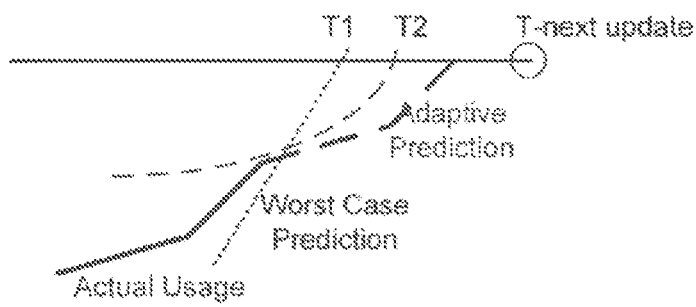
FIG. 5 is a diagram illustrating computation of a predicted threshold crossover point according to certain embodiments of the present invention, depicting that, approximation may be effected in several ways. Dotted lines reflect linear approximation used in prediction, while dashed line reflects parabolic approximation. Differing approximation techniques may lead to different disconnection times as shown.

Any suitable method (such as but not limited to linear or hyperbolic approximation) may be applied to compute a predicted threshold crossover point, e.g. as illustrated by FIG. 5 in which the y-axis represents quota utilization (MBytes) and the xAxis represents time.

In this example T1, a first predicted threshold crossover point, is generated by applying a "Sure" or "worst case" technique, which assumes that the user will utilize the full physical throughput all the time. Typically, it is assumed that in a worst case, a subscriber may reach a maximum utilization rate (e.g. utilize maximal physical line speed). T2, a second predicted threshold crossover point, is generated by considering one or more of actual utilization history, network loading and other factors.

Whereas in "worst case" prediction of the time to disconnection, a constant throughput at the level of the physical maximum is used in prediction computations, adaptive prediction of the time to disconnection, which is typically more accurate, computes on an assumption of average throughput or on an assumption of constant peak throughput, where the peak throughput for the subscriber's history over a pre-defined (e.g. 1 hour) period, e.g. window, is defined. For example if the subscriber's maximum connection speed was 1.2 MBit/s, in the last hour, vs. a physically possible 4 MBit/s, the value 1.2 will replace 4 in Formula A above.

Certain embodiments of the present invention include apparatus and method for performing precise run time control of volume quota utilization.

Self Adjusting Volume Enforcement functionality may include some or all of the following functionalities:

i. Computational prediction of the "Over Quota" time ii. A self-adjusting increase in preciseness of polling of quota utilization close to the predicted "Over Quota" time; and iii. Controllable e.g. self-adjusting disconnecting of the subscriber Each of the above functionalities is described in detail below:

i. Computational Prediction of the "Over Quota" Time:

For example by worst case approximation or adaptive approximation, both of which are typically provided as selectable options, of the time to disconnection.

Figure 6:
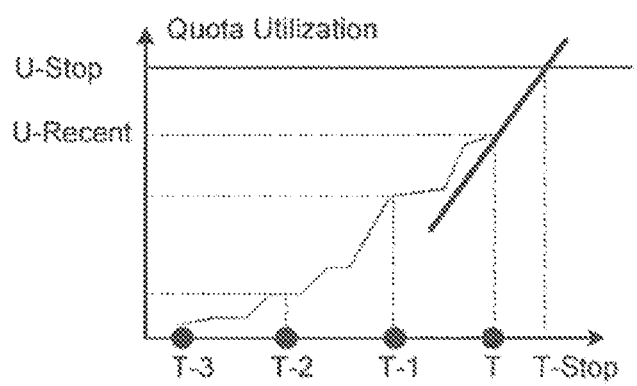
FIG. 6 is a quota utilization vs. time graph illustrating a Worst Case Approximation scheme operative in accordance with certain embodiments of the present invention. Worst Case Approximation typically comprises a linear approximation, where line parameters (incline) is computed assuming that a user utilizes maximum physical throughput available. This value is usually defined by Hardware, line and/or Policy characteristics.

Worst Case Approximation may be operative as shown in FIG. 6. Typically, T-Stop, the estimated time at which a subscriber is to be disconnected, is computed by using linear approximation, where the slope or incline is derived from the Maximal Possible Utilization rate:

$$T\text{-Stop}=T+(V\text{-Stop}-U\text{-Recent})/\text{Max. Utilization Bit Rate,}$$

where the Maximal Utilization Rate could be for example the Physical Line Bit rate or the Enforced Bit Rate per service.

Over Quota as well as Under Quota are typically computed after the service is stopped. At the T_Stop time, the system generates a stop command directed toward network controllers. After the service has terminated and the user has been disconnected, network controllers report the actual final utilization, and accounting engines use this number for the final bill. An advantage of certain embodiments shown and described herein is that the delta between the actually used quota and the pre-paid quota is diminished, ideally to zero. If a stop decision engine is activated solely based on utilization updates, with no prediction 5 involved, the last update will arrive sometime after the user or subscriber has finished her quota, such that quota leakage results.

Adaptive Approximation may take into account known utilization patterns of particular Subscribers, Services, Networks, etc. e.g. as per the following formula:

> Max. Utilization Bit Rate=$f$(Subscriber Utilization Pattern,Network Utilization Pattern,Service Utilization Pattern), where $f$ is a suitable application-specific formula typically tailored by operator and vendor.

For example:

> Max Utilization Bit Rate=((Max User Throughput for the last hour+Average User's Throughput in the appropriate Network Access Gateway+ Yearly Average Service Throughput)/3)

Maximum Utilization bit-rate is actually an approximated line incline (steep or smooth slope).

Maximum User Throughput for the last, say, hour is computed as the maximum from the several throughput values measured during the last hour. These measurements are reported to the accounting engines by the network devices. The device may be 20 reporting utilized quota each, say, K minutes. In this case Throughput value is computed as:

> Throughput=(Last Quota Utilization Report−Previously Used Quota)/($K$*60) and measured in Bytes/sec Every hour, the system may store 60 measurements of the quota usage by a given 25 subscriber or even by a given session. An hourly maximum is computed by selecting the maximum measurement from the sequence stored in the last hour.

Access GW throughput and Yearly average service throughput are examples of key performance indicators usually provided by the network management system and reporting engines correspondingly.

For example, a utilization pattern of a Video on Demand service is linear since Video is usually running with constant bit rate, but Maximal Utilization Rate depends on Screen Size and could be one of 1.5 MBit/s, 2.4 MBit/s, 7.6 MBit/s.

Figure 7:
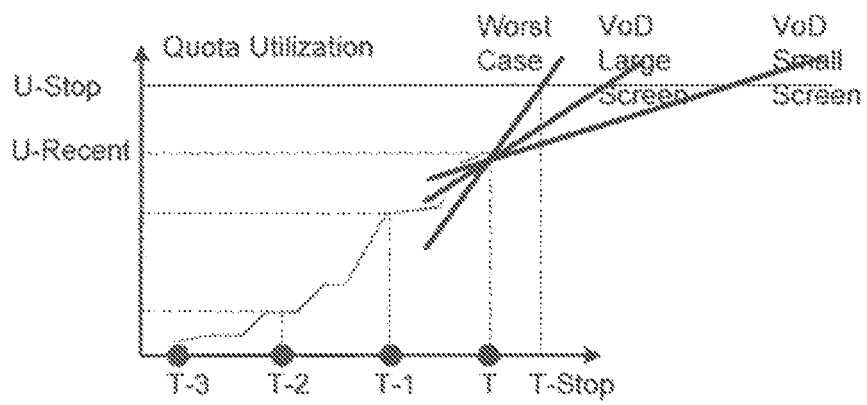
FIG. 7 is a graph of quota utilization vs. time depicting worse case and other approximation schemes such as adaptive extrapolation, all operative in accordance with certain embodiments of the present invention. As shown smart VoD tuned approximation takes into consideration the fact that in VoD applications, appropriate connection throughput is smaller than available physical throughput of the connection. VoD Large Screen and VoD Small Screen are typically associated with different throughputs.

FIG. 7 is a graph of quota utilization vs. time depicting worse case and other approximation schemes. U-RECENT stands for the recent quota utilization, U-STOP specifies the maximum quota available for the user/service at which the service is stopped and the user disconnected. For example U-RECENT is 50.5 MByte and U-STOP is 100 MByte, such that the User has reached more than 50% of the quota utilization.

Figure 8:
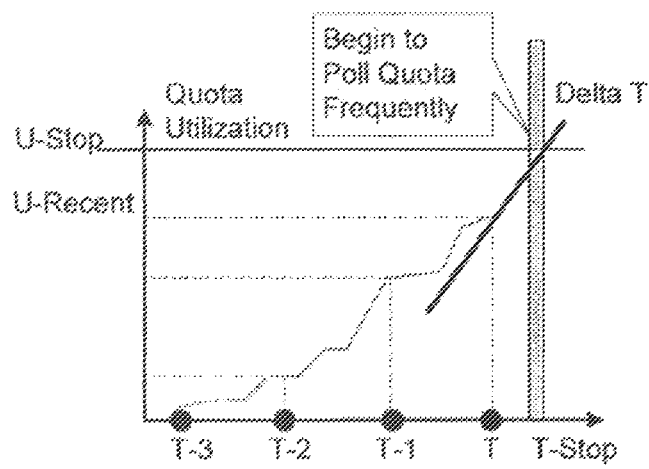
FIG. 8 is a graph describing activation of the frequent polling mechanism just before the quota is expected to be exceeded. Activation time is determined by using approximation techniques.

In some cases approximation is not linear and may, for example, be Parabolic or hyperbolic.

ii. Precise Polling of the Quota Utilization Close to the Predicted "Over Quota" Time:

Precise polling of the quota utilization close to the predicted "Over Quota" time e.g. as shown in FIG. 8.

As shown, the last before the end update (T time) activates the predictor that computes the time to start frequent polling ("just before the stop should happen") delta is configurable by operator thereby to enable accurate computing without overloading the system. Toward the end, frequent polling measurements come in which help to detect exact threshold crossover.

A common polling interval is 5-15 minutes, whereas according to certain embodiments, precise polling may occur each 1-30 seconds, although the time interval depends on device, network and control system performance.

Frequent polling of the quota utilization just before the Quota threshold crossover increases accuracy, which diminishes or minimizes quota leakage.

Figure 9:
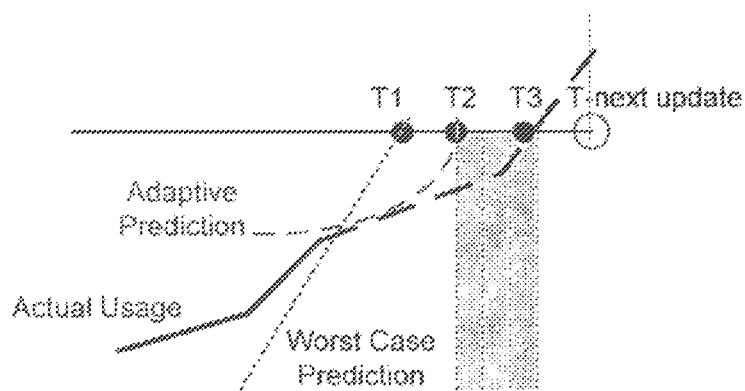
FIG. 9 is a diagram illustrating a quota leak caused by disconnecting on interim update.
Figure 1B:
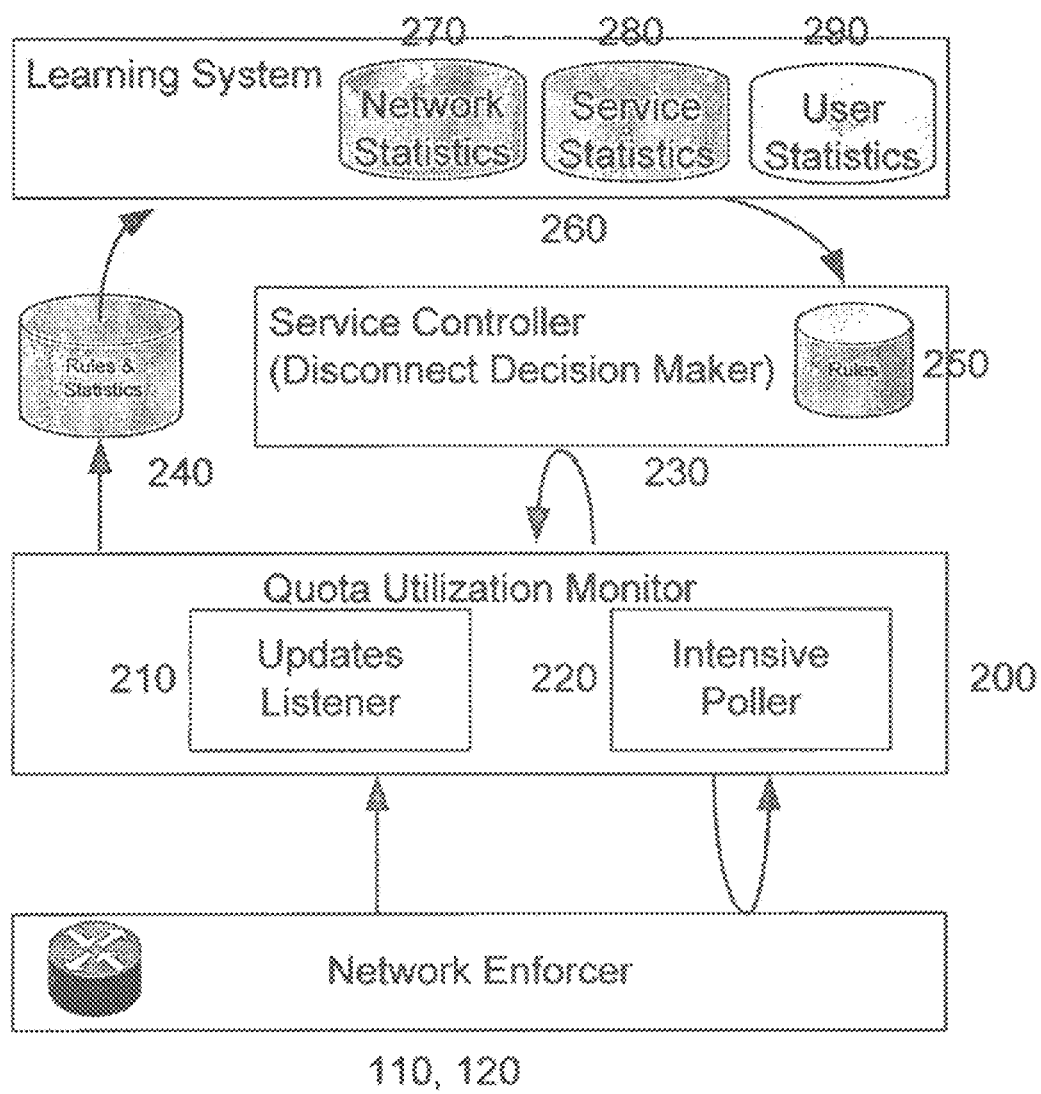

As shown in FIG. 9, disconnecting on interim update may cause a quota leak.

Using worst case prediction typically prevents quota leak, while introducing small overcharging, Adaptive prediction typically minimizes overcharging (better than worst case). Complementing Adaptive prediction with a Frequent utilization poll will bring overcharge to the controllable minimum, as discussed in detail below.

iii. Controllable Disconnecting:

Operator may set allowed inaccuracy of the disconnect. Ping rate (typically 1/Ping Period in Seconds) is computed correspondingly:

Ping Period=Max. Allowed Quota Leak / Max. Utilization Bit Rate

After Ping, fetch Utilization value, where Ping is the message that corresponds to the most recent utilization value. An estimated over quota time may be computed as follows:

Over Quota Time=Known Quota Rest/Computed Quota Burn Rate (e.g. same as for computed throughput). Estimation may employ either worst case approximation e.g. as shown in FIG. 6, or adaptive extrapolation e.g. as shown in FIG. 7.

The Self Adjusting Volume Enforcement System, according to certain embodiments of the present invention, may include some or all of the modules shown in FIG. 10: a learning system, a service controller, a quota utilization monitor and a network enforcer.

The Network Enforcer is typically responsible for connection management. Conventional devices include Access Gateway, Broadband remote Access Server and DPI.

The Quota Utilization Monitor monitors utilization by collecting utilization data from the network enforcers e.g. by listening to the device originated utilization update notifications and/or by polling for current utilization. Conventional protocols for utilization notification and for polling are RADIUS and DIAMETER. In some cases SNMP and other protocols could be used. Utilization information may be reported as a set of counters counted from the connection activations (termed herein "Account Start") and including some or all of: session duration, transferred volume Up, Down, other countable units, such as SMSes, etc. The Quota Utilization monitor is responsible for checking quota utilization vs. pre-allocated quota as well as overall quota utilization vs. pre-configured utilization threshold. All of the thresholds may be set per user, per service or combinations thereof. If one or more of the thresholds are crossed, the Utilization monitor fires events to the Service Controller.

The Service Controller is responsible for decision-making regarding user, service, etc. on quota threshold crossover. Decision is based on pre-configured rules and may include one or more commands such as disconnect, restrict access, ask higher level system, etc. issued per user, service, or communication protocol. The commands are assumed to be provided to the network enforcers.

For example a particular user has a limitation of 50 MByte for VoIP service. In the event that this quota is exceeded user might for example be:

Disconnected (to ensure fair use in zones with resource deficit); and/or

Charged extra.

The operator configures the service controller to apply extra-charge as a default decision on quota exceeded. A specific user who does not want to pay extra may overwrite the default and configure the engine to disconnect when quota is exceeded. Service control is applicable per user. The learning system accumulates short and long term Key Performance Indicators e.g. statistical data about user, service, network behavior, used in advance for tuning the approximation formulas. For example, collecting quota utilization by a user during the last hour with a suitable e.g. 5 minute resolution, may be useful for computing an individual subscriber's peak throughput which may be an input to the adaptive functionalities described above. The Quota Utilization Monitor of FIG. 10, also termed herein a QUM, typically comprises a mediation module that interacts with network equipment such as but not limited to an Access Server and/or Accounting Server in order to obtain most updated information about quota utilization. The quota utilization monitor may work in a passive mode, listening to utilization updates coming from the network, or in an active mode, querying the network as to the current level of quota utilization. RADIUS or DIAMETER messages may be employed. RADIUS and DIAMETER are widely used standard protocols running the following logical messages:

Start of the accounting

A plurality of Utilization Updates

Stop of the accounting

The above sequence is reported per stream associated with the service (e.g. Internet, Voice over IP, Video On Demand) activated by the user.

The Service Controller of FIG. 10, also termed herein SC, typically comprises an engine that performs some or all of the following steps, suitably ordered, e.g. as shown:

a. Obtain utilization per User's Service stream
b. Update Total from the beginning of the session
c. Check if pre-allocated quota threshold is exceeded
d. If NOT in Frequent Poll Mode:
e. ask for additional quota (Online Charging System is to be queried)
f. If additional quota provided, update quota threshold
g. If no additional quota provided, activate frequent polling.
ELSE//Infrequent polling and/or handling of the low rate device-initiated notifications
h. Compare Utilization Counter vs. Computed Stop Threshold. If counter has reached threshold, Disconnect I Restrict subscriber (as specified in application-specific configuration). ELSE continue to poll.

Independently the same utilization counter is delivered to the learning system, which computes Key Performance Indicators according to pre-configured rules such as:

rule a: Store counter per user & per service in a User statistics DB 290.
rule b: Find maximum from among the counters stored during the last hour
rule c: Update Peak Throughput in Decision engine configuration, assuming that throughputs are configured per user and per service. Incoming information regarding recent quota utilization is useful in order to determine run time commands toward the quota utilization monitor and may for example be operative to perform one or more of the following:
  a. Move from passive (listen to updates) to active (query information) mode and
  b. Stop Service, when "Over Quota" is expected soon.

The Service Controller logic is typically driven by rules. Each rule typically describes a computation formula and a consequent action, typically using tunable parameters on per user and service base. For example:

```
If (UserID = John Smith AND ServiceID = Internet) {
  If (lastQuotaAppliedFlag) {
    If (TRecent >= TTerm) {
      Read configuration and apply {Disconnect, Restrict, etc.}
    }
  }
  Else {// Compute termination Time
    TTerm = TRecent + QRest*8*1024*1024 /UTh*1OOOOOO
  }
}
```

In the above:
UserID is unique user identifier,
Service ID—service identifier,
LastQuotaAppliedFlag is raised when there is no more quota for this user and service and hence some "over quota" action takes place.
TRecent—recent time.
TTerm—Time to act (e.g. terminate service, restrict, etc.)
QRest—rest of quota which remains to be utilized.
UTh—utilization throughput (computed by the learning system per user & service, or permanent pre-configured worst case)

Rules are typically used to predict "Quota is close to the threshold" situations, and/or to determine when to perform above-described mode switch and disconnection.

The Learning System of FIG. 10, also termed herein LS, typically runs above the data prepared by the quota utilization monitor (e.g. accounting data) and performs updates and fine tuning of the rules and parameters.

For example, the Learning system may store utilization measurements per user & per service for a predefined (e.g. 1 month) period with 1 min-30 min intervals. This stored information may help compute peak historical utilization rate e.g. as a MAX of stored measurements. History depth may be specified in a configuration of the Learning system.

Additional DB's may be provided to store traffic statistics per network elements, services network averages, etc. So that learning system may implement more complicated computations such as averages of User & Service peak utilization+overall service average, etc.

The learning system may be able to select prediction formula from a pre-defined set thereof due to criteria (such as prediction accuracy, measured as minimum of the computed and actual utilization performed by several different formulas as well as tuning parameters of the appropriate formula based on evaluation of the formula with different fluctuating parameters. All of the above is typically performed per user & service base.

The method of operation of the Learning system typically includes the following:

a. Obtain utilization update (user & service, network element, etc.)
b. Add current measurement to the history including (collection of the measurement is stored for configurable time period and used in analysis, such as 5 maximum throughput from that measured in the course of the last hour.
c. Clean-up redundant statistics which are older than the current history window.
d. Periodically run re-computation (configurable either per user, user & service, etc.), e.g. including:
  d1. Select Peak utilization for a pre-configured history depth.
  d2. Update Service Controller Configuration (update Utilization Throughput per User & service) used in quota threshold computation.

Figure 11:
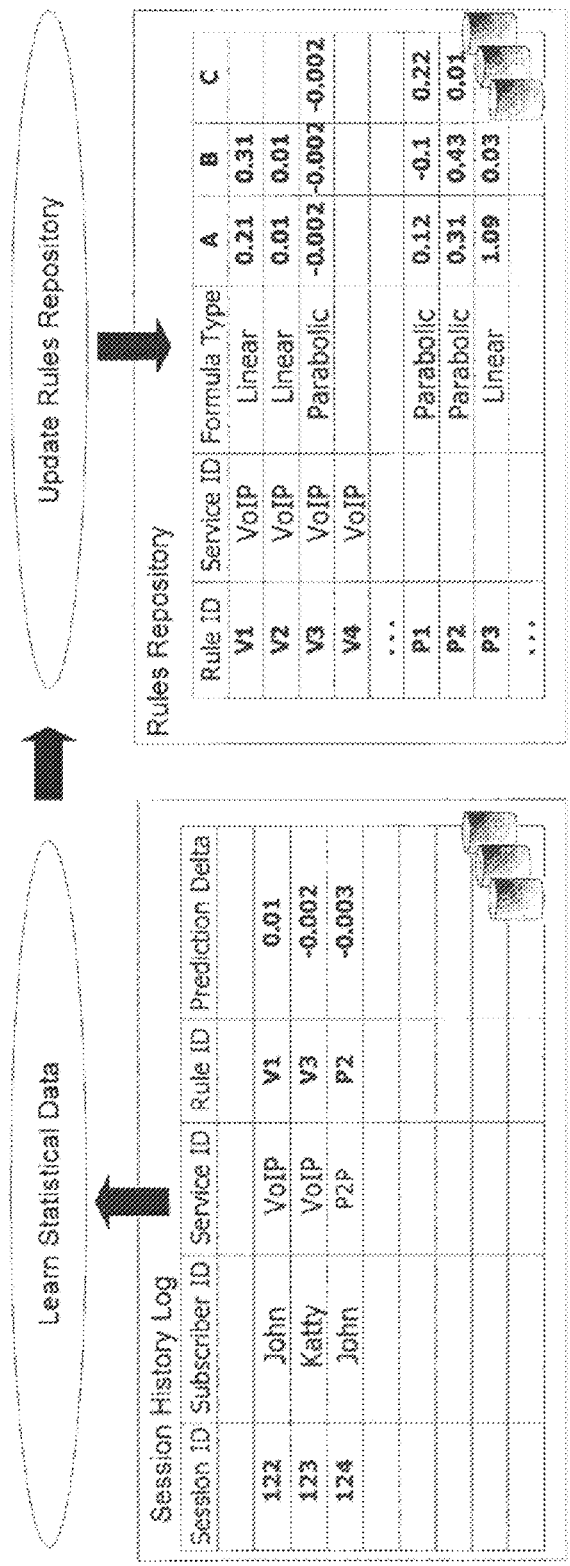
FIG. 11 is a diagram showing a mode of operation of the Learning System of FIG. 10, operative in accordance with certain embodiments of the present invention.

Typically, the Learning System, as shown in the diagram of FIG. 11, is operative to analyze previous crossover predictions and determine how successful they were, e.g. to compare each of a hyperbolic crossover prediction and a parabolic cross-over prediction to the actual cross-over once it occurs, or to compare various coefficients used (or not) to ascertain which is or would be most successful. Various prediction types may be tailored and selected by an operator. Suggested approximation types may include but are not limited to Linear, Hyperbolic and Parabolic.

Approximation formula may be applied on a per service base and may vary due to at least one of the following criteria a service behavior pattern. For example a video service y usually runs with constant bit-rate, which is mapped to the linear approximation $y=m*x+n$. In contrast, gaming services typically consume a great deal of volume initially, for downloading images, settings, etc.) and a much smaller volume amount afterward, which is mapped to the hyperbolic formula $m*x^2-n*Y^2=1$. Services like Internet browsing, e-mail, and VoIP may each be mapped to a different formula. Linear approximation based on average throughput is a first possible solution. FIG. 11 illustrates a method of operation for the learning system. A "Session history log" table typically stores utilization measurements per session, e.g. per every service being run by an individual user. Network enforcement devices provide periodic updates of the quota utilization by the session. Steps may include:
  a. Learning system performs evaluation of the estimated quota utilization at the time the next update is to come. Evaluations may employ any suitable formula (e.g. linear and Hyperbolic) and expected values are also stored in the History log.
  b. When update actually comes, learning system compares all the evaluations stored per given session, with the actual utilization result in the update. Typically, the closest prediction is deemed a winning formula
  c. The winning formula is saved into the Rules repository, III a position associated with the appropriate session.
  d. When the decision engine is subsequently activated to predict session stop time, —the winning formula will be identified and used in prediction.

It is appreciated that the Self Adjusting Volume Enforcement solution, methodology and system modules shown and described herein are typically designed to be incremental and flexible, and may for example utilize one or more components and methods; also, more advanced methods could be added on top of the methods shown and described herein. For example, as shown in FIG. 12a-12b, a worst case prediction solution may employ a quota utilization monitor e.g. as described herein with No Polling in combination with a Service Controller e.g. as described herein with no advanced rules.

Figure 12A:
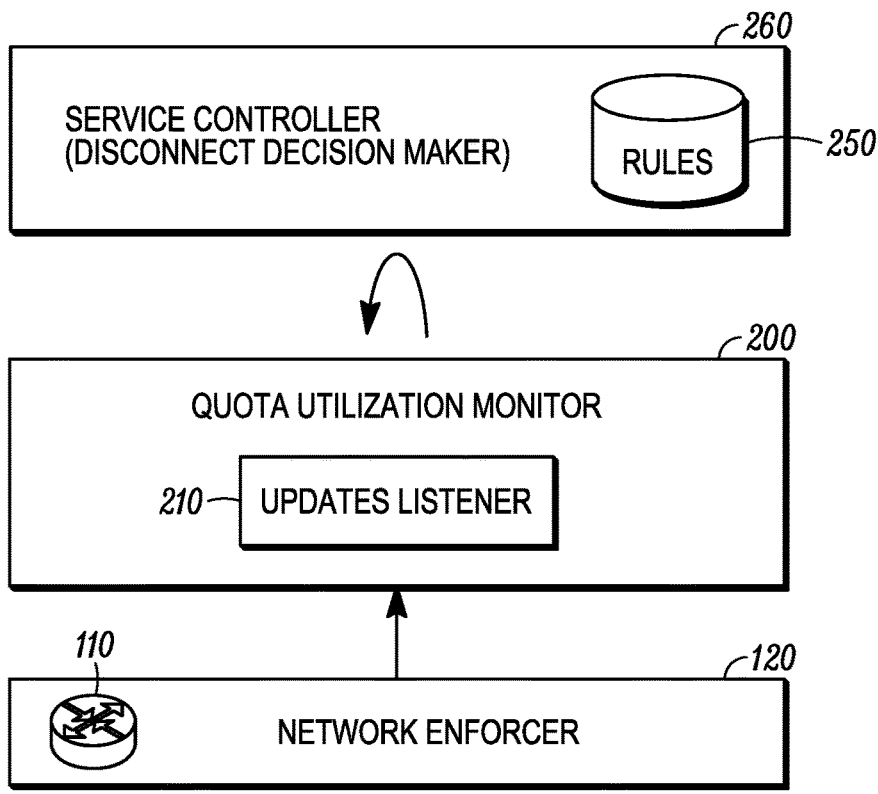
FIG. 12a is a diagram of a less costly, worst case prediction solution employing a quota utilization monitor with No Polling in combination with a Service Controller with no advanced rules, all in accordance with certain embodiments of the present invention.

Referring now to FIG. 12a, a decision making engine 260 may use Rules DB 250, assuming that a "best" rule is configured per service running by a given user; typically, Rule I formula ID is associated with the session control configuration.

Rule/formula ID may be managed by decision engine 260 itself using a map (e.g. service type-7 rule ID/formula) or by the learning system. If the learning system is involved in managing rules, the system typically accumulates variable statistical data, such as but not limited to some or all of the following:
  a. User & Service utilization history coming from the Network Enforcers (110, 120) and stored in the User Statistics DB 290 in FIG. 10
  b. Access network throughput statistics coming from the network management systems and stored in the Network Statistics DB 270 of FIG. 10
  c. Service behavior Statistics, coming from the business management systems and stored in the Service Statistics DB 280 of FIG. 10.

Figure 12B:
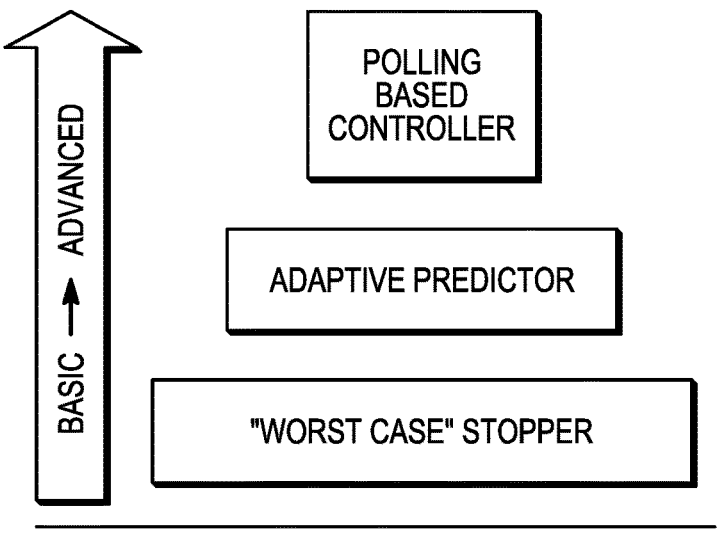
FIG. 12b illustrates 3 possible levels of technical solution wherein a higher, "better" level is built above the lower, i.e. employs the lower level solution in its own implementation.

Data aggregated in one or more of the above databases may be handled by the learning system as described above in order to fine-tune prediction rules Using a learning process Referring now to FIG. 12b, the following stages of operation may occur:
  a. Service controller detect; the state where the time to stop is less than or equal to the time at which the next utilization update is due to come.
  b. In this situation the service controller activates the predictor in order to determine a predicted time to take a decision which is more exact than next update.
  c. When the predicted time comes, the service controller decides what to do due to available system tools and configuration settings. Possible options may for example include: Stop Service/Disconnect User and/or Start Frequent polling of the quota utilization and stop when over quota.

Additional rules such as time of the day correction and network loading factor correction may be added together with the learning system on top of the worst case predictor.

A polling engine may be added on top, of either Basic or Advanced predictors e.g. as illustrated in FIG. 12b. "Basic" prediction is characterized by pre-defined throughput and a static formula used for computing TStop, the Over-Quota Time. "Advanced" prediction is characterized by updatable throughput generated by the learning system which updates the throughput, based on periodic handling of stored statistics. Formulas described above may be specific to a time of the day, day of the week, specific service etc. For example, a game's throughput may be heavy initially but may decrease to a lower level after the game's first 2 minutes. In this case, a pre-defined worst case may be used initially as a prediction formula, and a computed average may be used for prediction from, say, minute 2 of the game onward.

Figure 13A:
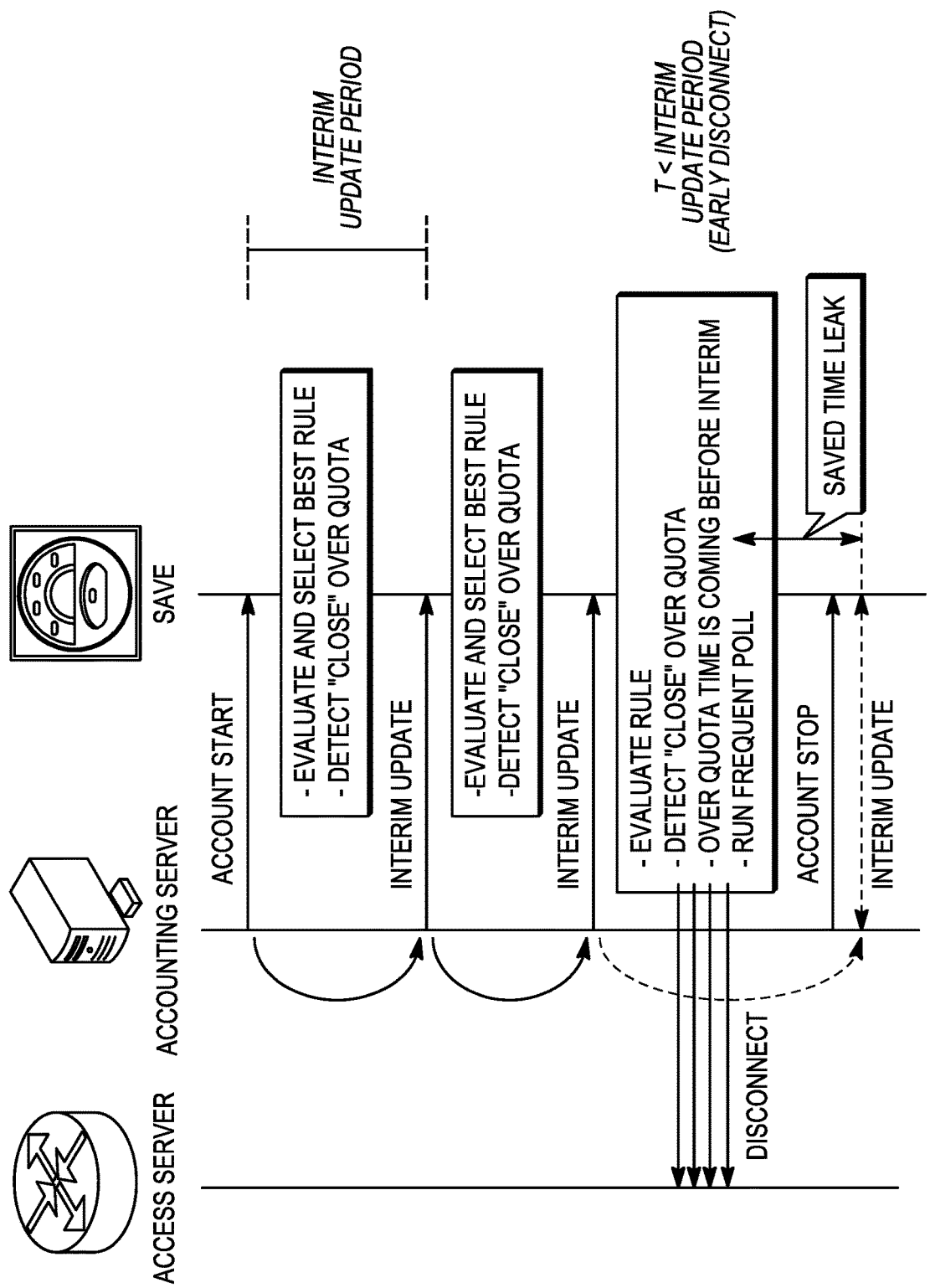
FIG. 13a illustrates an example operation flow for the Self Adjusting Volume. Enforcement system of FIG. 10, in accordance with certain embodiments of the present invention.

FIG. 13a illustrates an example operation flow for the Self Adjusting Volume Enforcement functionality.

Figure 13B:
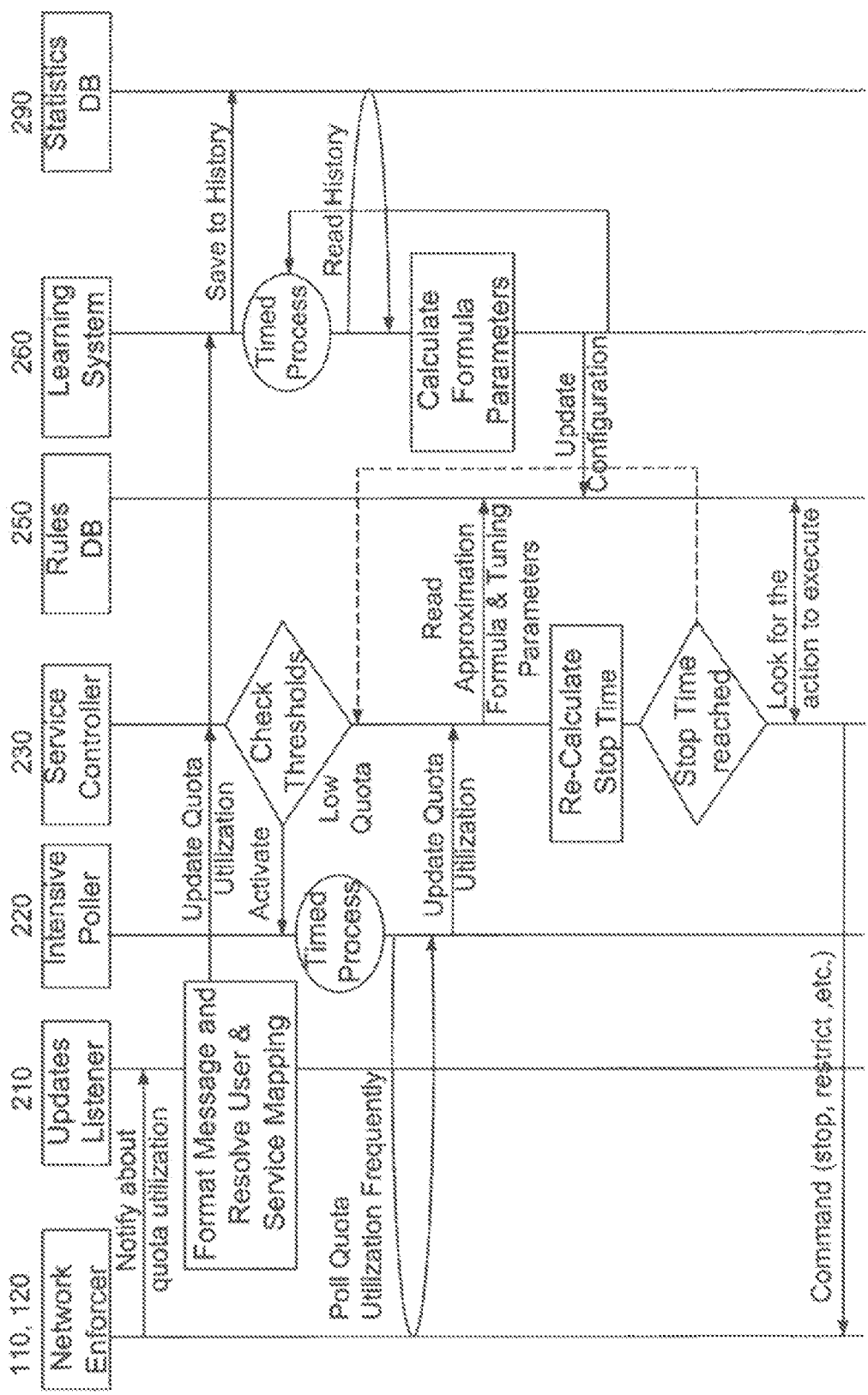
FIG. 13b illustrates an example operation flow depicting typical methods of operation for the components of the apparatus of FIG. 12a, in accordance with certain embodiments of the present invention.

FIG. 13b illustrates an example operation flow depicting typical methods of operation for the components of the apparatus of FIG. 12a, in accordance with certain embodiments of the present invention. The Access Server and Accounting Server shown in FIG. 13a are shown as a single Network Enforcer functionality in FIG. 13b.

It should be emphasized that the above-described embodiments of the present invention, are merely possible examples of implementations, merely set forth for a clear understanding of the principles of the invention. Many variations and modifications may be made to the above-described embodiments) of the invention without departing substantially from the spirit and principles of the invention, such as embodiments which include less than all of the features described herein, or combinations of such embodiments and/or of embodiments described herein.

For example, a quota Leakage detection and prevention functionality such as that shown and described herein may be provided as a Run Time module and may be used either stand alone, e.g. server based, or in conjunction with suitable accounting infrastructure such as the RADIUS Server. Also, a Learning system that evaluates accounting logs may be used to create a fine tuned configuration for the quota Leakage detection and prevention functionality, e.g. by implementing suitable statistical processes. For example, as described above, statistics re one or more of user, service, network utilization may be measured periodically and stored in the user statistical DB 290.

A Background learning system may use these statistics for computing predictions which are more accurate than "worst case" predictions, such as "last hour maximum", "typical services behavior", "week-end utilization", etc.

Typically, an actual consumption pattern, for example Linear Video Rate Based for Video on Demand, or Linear Average for Internet Browsing is matched with a suggested rule—e.g. Linear with a particular slope coefficient. All such modifications and variations are intended to be included herein within the scope of this disclosure and the present invention.

It is appreciated that the applicability of the methods and apparatus shown and described herein are not limited to ISPS and has a broad range of possible applications including but not limited to NPA, MSO and mobile communication applications.

Modules of the present invention may for example be implemented in JAVA.

It is appreciated that estimation of time at which quota will be exceeded or of whether or not an upcoming update will occur only after quota is exceeded, may take into account the application being used by a subscriber, e.g. as indicated by the subscriber's service contract, such as taking into account the differing rates of utilization characterizing VoIP as opposed to games, as opposed to peer-to-peer and video on demand, etc., and/or different "shapes of volume utilization e.g. sinusoidal for VoIP and constant for video applications. Estimations may also take into account known subscriber volume, utilization patterns e.g. for a particular category of subscriber such as for a particular country. Certain embodiments of the present invention are particularly suited to applications which utilize a large volume per unit of time and to networks with good volume utilization measurement capabilities and expensive bandwidths such as cellular networks.

It is appreciated that monitoring for volume utilization may be effected, for example, by polling or by providing a controllable notification rate e.g. by having a network enforcer change a previous utilization notification frequency.

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable sub-combination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps there within, and functionalities described or illustrated as methods and steps therewith in can also be provided as systems and subunits thereof. The scale used to illustrate various elements in the drawings is merely exemplary and/or appropriate for clarity of presentation and is not intended to be limiting.

The invention claimed is:

1. A computer, comprising:
   an interface circuit configured to communicate with an electronic device;
   a processor; and
   memory configured to store program instructions, wherein, when executed by the computer, the program instructions cause the computer to perform operations comprising:
     monitoring, using a utilization monitor, utilization of a network resource in a data network associated with a user, wherein the monitoring involves a non-zero monitoring frequency; and
     modifying, using a service manager, the monitoring based at least in part on the monitored utilization, an estimated utilization corresponding to a dynamic throughput, and a dynamic policy, wherein the dynamic policy comprises proximity to an authorized amount of utilization associated with the user, and
     wherein the modifying of the monitoring comprises changing the monitoring frequency to a second non-zero monitoring frequency in order to detect when the utilization equals or exceeds the authorized amount of utilization.

2. The computer of claim 1, wherein the utilization is associated with a data flow or a group of data flows.

3. The computer of claim 1, wherein the operations comprise performing, using a service controller, a remedial action based at least in part on the monitored utilization.

4. The computer of claim 3, wherein, when the monitored utilization is proximate to the authorized amount of utilization, the remedial action comprises reducing or stopping service to the user.

5. The computer of claim 4, wherein the reducing or stopping of the service comprises providing, from the interface circuit, an instruction to reduce or stop the service addressed to the electronic device.

6. The computer of claim 1, wherein the monitoring comprises receiving information about the utilization associated with the electronic device.

7. The computer of claim 1, wherein the electronic device comprises one of: an access point, an access server, or a gateway.

8. The computer of claim 1, wherein the utilization of the network resource comprises a data volume.

9. The computer of claim 1, wherein the monitoring of the utilization comprises estimating the utilization based at least in part on previous instances of the monitored utilization.

10. The computer of claim 1, wherein the computer comprises a computer system.

11. A non-transitory computer-readable storage medium for use in conjunction with a computer, the computer-readable storage medium storing program instructions, wherein, when executed by the computer, the program instructions cause the computer to perform operations comprising:
monitoring, using a utilization monitor, utilization of a network resource in a data network associated with a user, wherein the monitoring involves a non-zero sampling frequency; and
modifying, using a service manager, the monitoring based at least in part on the monitored utilization, an estimated utilization corresponding to a dynamic throughput, and a dynamic policy, wherein the dynamic policy comprises proximity to an authorized amount of utilization associated with the user, and
wherein the modifying of the monitoring comprises changing the monitoring frequency to a second non-zero monitoring frequency in order to detect when the utilization equals or exceeds the authorized amount of utilization.

12. The non-transitory computer-readable storage medium of claim 11, wherein the utilization is associated with a data flow or a group of data flows.

13. The non-transitory computer-readable storage medium of claim 11, wherein the operations comprise performing, using a service controller, a remedial action based at least in part on the monitored utilization.

14. The non-transitory computer-readable storage medium of claim 13, wherein, when the monitored utilization is proximate to the authorized amount of utilization, the remedial action comprises reducing or stopping service to the user.

15. The non-transitory computer-readable storage medium of claim 13, wherein the reducing or stopping of the service comprises providing an instruction to reduce or stop the service addressed to an electronic device.

16. The non-transitory computer-readable storage medium of claim 11, wherein the monitoring of the utilization comprises estimating the utilization based at least in part on previous instances of the monitored utilization.

17. The non-transitory computer-readable storage medium of claim 11, wherein the computer comprises a computer system.

18. A method for modifying monitoring of utilization of a network resource, comprising:
by a computer:
monitoring, using a utilization monitor, the utilization of the network resource in a data network associated with a user, wherein the monitoring involves a non-zero sampling frequency; and
modifying, using a service manager, the monitoring based at least in part on the monitored utilization, an estimated utilization corresponding to a dynamic throughput, and a dynamic policy, wherein the dynamic policy comprises proximity to an authorized amount of utilization associated with the user, and
wherein the modifying of the monitoring comprises changing the monitoring frequency to a second non-zero monitoring frequency in order to detect when the utilization equals or exceeds the authorized amount of utilization.

19. The method of claim 18, wherein the monitoring of the utilization comprises estimating the utilization based at least in part on previous instances of the monitored utilization.

20. The method of claim 18, wherein the method comprises performing, using a service controller, a remedial action based at least in part on the monitored utilization.

* * * * *